United States Patent [19]

Meier

[11] Patent Number: 4,936,472
[45] Date of Patent: Jun. 26, 1990

[54] ARRANGEMENT FOR HOLDING COMPONENTS IN A STACK

[75] Inventor: Hans-Jürgen Meier, Aalen, Fed. Rep. of Germany

[73] Assignee: Carl-Zeiss-Stiftung, Heidenheim/Brenz, Fed. Rep. of Germany

[21] Appl. No.: 176,659

[22] Filed: Apr. 1, 1988

[30] Foreign Application Priority Data

Apr. 2, 1987 [DE] Fed. Rep. of Germany ....... 3711164

[51] Int. Cl.⁵ .............................................. A47G 19/08
[52] U.S. Cl. .................................. 211/194; 211/59.4; 211/41
[58] Field of Search .................. 211/41, 40, 194, 59.4; 350/318, 580, 257, 321

[56] References Cited

U.S. PATENT DOCUMENTS

| | | |
|---|---|---|
| 4,311,364 | 1/1982 | Motomura . |
| 4,390,242 | 6/1983 | Tatsumi . |
| 4,443,061 | 4/1984 | Coquin . |
| 4,653,649 | 3/1987 | Holdredge, Jr. ................... 211/41 |

FOREIGN PATENT DOCUMENTS

| | | |
|---|---|---|
| 3419298 | 11/1985 | Fed. Rep. of Germany . |
| 3534955 | 10/1986 | Fed. Rep. of Germany . |
| 8622121 | 11/1986 | Fed. Rep. of Germany . |

*Primary Examiner*—Blair M. Johnson
*Attorney, Agent, or Firm*—Walter Ottesen

[57] ABSTRACT

The invention is directed to an arrangement of plug elements which are joined together to define an axial direction and the attachment of one or more components is made to the outside of the plug elements in the direction perpendicular to the plug element axis. The connection of the individual plug elements can be permanent and releasable.

13 Claims, 7 Drawing Sheets

ARRANGEMENT FOR HOLDING COMPONENTS IN A STACK

FIELD OF THE INVENTION

The invention relates to an arrangement for holding a plurality of components in a stack and includes a plurality of plug elements.

BACKGROUND OF THE INVENTION

The plugable arrangements known in optics are spacer rings or mountings for holding the optical components in the inside region of the mountings. In this connection, reference may be made to U.S. Pat. Nos. 4,390,242; 4,443,061; and 4,311,364 as well as German Patent No. 3,534,955. Plug connections for carrying cords or carrying chains for optical devices are also known and reference may be made to German Patent No. 3,419,298, for example. A fixing device is disclosed in German utility model registration No. 86 22 121 for a fiber light conductor. The fixing device is in a plug housing wherein an inner holding body is utilized.

In addition, it is known to use an annular end flange made of individual units for Wolter telescopes. The individual attachment rings are telescopically mounted one inside the other and the individual tubes of the telescope are attached to the rings. The assembly of the individual tubes begins from the inside. Each tube must be individually adjusted and fixed. The attachment arrangement must be suitable for hyperbolic tubes as well as for parabolic tubes. The attachment rings have the function of expansion collars and are disposed once in the center and once at each of the two ends of the tube packet. This arrangement for attaching requires a very complicated structure of the mounting elements.

SUMMARY OF THE INVENTION

It is an object of the invention to provide an arrangement for securely holding components in a stack which makes possible a step-like assembly of the stack.

The arrangement of the invention is for holding components in a stack and includes: a plurality of plug elements arranged in a stack having a longitudinal axis; each of the plug elements having an insert portion and a socket portion at respective longitudinal ends thereof; the insert portion of each of the plug elements being dimensioned to engage the socket portion of the next adjacent element in the stack; each two mutually adjacent ones of the plug elements having respective contact engaging surfaces which are in contact engagement with each other when the plug elements are stacked thereby defining the longitudinal axis of the stack; and, each of the plug elements having an outer surface extending substantially parallel to the longitudinal axis of the stack and defining holding means for holding one of the components thereon.

The plug elements make it possible to build up spokes on the outer side of which components can be attached. It is essential that the resulting spokes can be built up in individual steps and that the attachment is made at specific points or along the entire outer surface as required. The plug elements generate a spatial orientation in an advantageous manner by means of a suitable configuration. In this way, a directional orientation in the desired manner is assured when building up the spokes. A rotation about the plug axis is prevented by means of a suitable configuration.

An opening in the direction of the plug axis provides on the one hand for a weight reduction while, on the other hand, facilitates making a fixed releasable attachment for the plug elements. Tension elements provide a tight and yet nonetheless releasable connection pursuant to an especially advantageous attachment of this kind. An especially advantageous releasable connection is obtained if the individual plug elements are connected to each other with a threaded connection.

A fixed and tight attachment is obtained when the individual plug elements are cemented.

The plug elements can affect a clamping or need only have recesses for attaching the components in dependence upon the nature of the attachment of the components. The possibility of attachment of the components on the plug elements can be at one location or about the periphery of the components. The cross section of the plug elements perpendicular to the axis along which the insert connections are made can have any surface form.

The particular form of the plug elements is dictated by the requirement at hand and can be varied as desired during the course of the insert process to adapt the same to a particular problem. Especially the dimension of each receiving slot can be adapted to the form of the actual component lying within manufacturing tolerances. This adaptation with respect to the component to be attached can be made even during the assembly process. The special capacity for adaptation of the arrangement according to the invention makes itself especially manifest in that the plug elements can be fitted individually to the components to be held and thereby obtain defined conditions at the holding points.

With the plug elements of the invention, spokes can be built up in an advantageous manner with an inner element being connected with an outer element during the slow assembly of the connecting lines. This is especially the case when connecting the inner and outer support tubes of a Wolter telescope by means of radial spokes. For this purpose, at least two spoke planes should be provided with three spokes arranged in each plane with a group of tubes thereby being held by at least six spokes.

The components are connected with the plug elements by means of adhesive because of a necessary rigid connection during the assembly of a Wolter telescope. A substantial reduction in weight is thus obtained when compared to previous constructions utilizing center flange means. By means of the invention for attaching components, groups of tubes can be secured at their Bessel points with a suitable configuration of the plug elements.

BRIEF DESCRIPTION OF THE DRAWINGS

The invention will now be described with reference to the drawings wherein:

FIG. 1b is a plan view of the plug element shown in FIG. 1a;

FIG. 2a shows a spoke assembly made with a plug element according to the invention which is a third variation of the kind shown in FIG. 1a;

FIG. 2b is a spoke assembly made with a plug element which is a fourth variation of the kind shown in FIG. 1a;

FIG. 4 is an assembly arrangement of a Wolter telescope utilizing the plug elements of FIG. 1a;

FIG. 6 is a spoke assembly made with a plug element according to a fourth embodiment of the kind shown in FIG. 5a;

DESCRIPTION OF THE PREFERRED EMBODIMENTS OF THE INVENTION

Figure 1A:
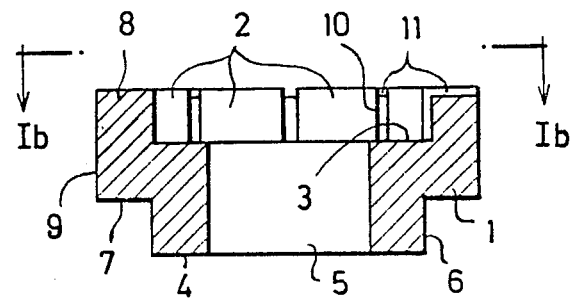
FIG. 1a is an elevation view, in longitudinal section, of a plug element having a bore extending therethrough.

The plug element 1 shown in longitudinal section in FIG. 1a has a central bore 5 and permits the assembly of a spoke by joining several of the same or adapted insert elements 1. A through-hollow space remains free when several plug elements 1 are joined. A hollow space is formed because of the desire for obtaining a reduction in weight and for realizing a connection releasable from within. This releasable connection (not shown) at the inside permits a free and undisturbed assembly at the outer surfaces and operates as a clamp when cementing the individual plug elements 1 together.

When joining two plug elements 1, the upper plug element 1 can either lie with the inner plug end face 4 on the inner socket end face 3 of the lower plug element 1 or lie with the outer plug end face 7 on the outer socket end face 8. Both possibilities ensure a defined seat. When applying adhesive, care must be taken that these surfaces (3, 4, 7, 8) are not cemented together. Since the adhesive on the one hand has a different thermal coefficient of expansion than the material of the plug element and, on the other hand, the particular thickness of the adhesive film cannot be predicted without difficulty, the use of these surfaces (3, 4, 7, 8) would reduce the quality of the assembled spoke.

The socket diameter 2 and the plug diameter 6 of the plug element 1 are especially suited as cementing surfaces when tightly connecting the individual plug elements 1 for building up a spoke. In order to apply the adhesive and yet not have to loosen individual plug elements 1, it is advantageous to provide adhesive pockets 10 on the socket diameter 2 or on the plug diameter 6 into which the adhesive can be placed through the adhesive channels 11. It is also possible that the adhesive pockets 10 are connected with each other and the adhesive is supplied only through the adhesive channel 11.

Figure 1B:
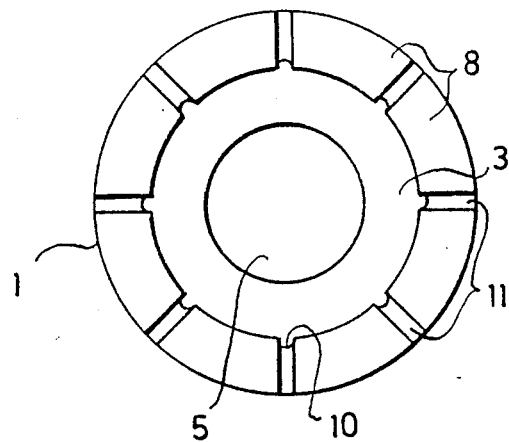

FIG. 1b is a plan view of the plug element 1. In addition to the central bore 5, FIG. 1b shows the inner end face 3 and the outer end face 8. Adhesive channels 11 are formed in the outer end face 8 and these adhesive channels 11 open into the adhesive pockets 10.

Figure 1C:
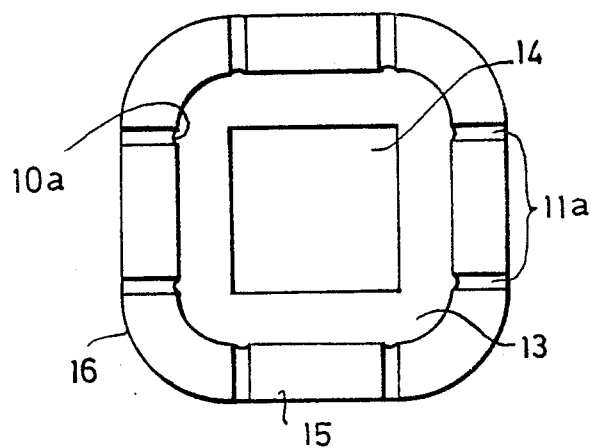
FIG. 1c is a plan view of a second embodiment of the plug element of the kind shown in FIG. 1b.

FIG. 1c shows a plug element variation 16 of the plug element 1 wherein the plug element has a square section with rounded corners. Here too, a central bore 14, an inner socket end face 13 and an outer socket end face 15 are provided. In addition, adhesive channels 11a and adhesive pockets 10a are provided.

Figure 9:
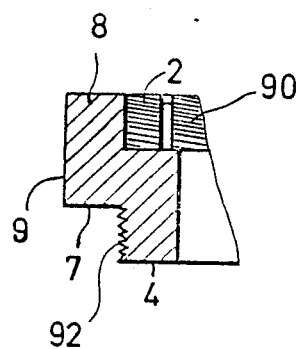
FIG. 9 is a plug element having thread means formed thereon for effecting a connection thereof with other plug elements.

The outer surface 9 is orientated so that it is parallel to the direction in which the plug elements are joined one to the other. In dependence upon the configuration of this outer surface 9, the components to be attached can be clamped, cemented or attached in any other manner. A thread formed on the socket diameter 2 and on the plug diameter 6 is especially suitable in order to obtain a threaded connection between two plug elements 1. This embodiment is shown in FIG. 9 with a first thread 90 formed on the surface of the socket diameter 2 and a second thread 92 formed on the surface of the plug diameter 6.

Figure 2A:
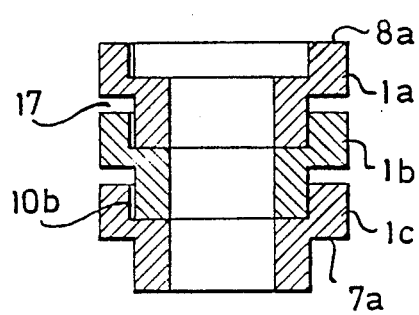

FIG. 2a shows how the joined plug elements (1a, 1b, 1c) fit together. A receiving slot 17 in which a component can be attached is formed by joining the plug elements (1a, 1b, 1c) as shown in FIG. 2a. The receiving slot 17 is formed between the outer plug end face 7a of the plug element 1a and the outer socket end face 8a of the plug element 1b. The space for the attachment can be continuous or be provided only at one or more sides. The same relationship is provided between the plug elements 1b and 1c. The receiving slot 17 makes it possible to do without adhesive channels so that the adhesive pockets 10b can be filled from the outside by receiving slot 17.

Figure 2B:
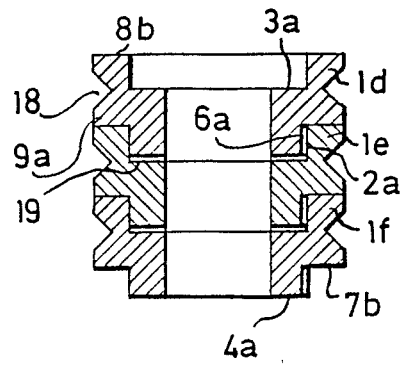

In FIG. 2b, an anchoring groove 18 is provided in the outer surface 9a of the plug elements (1d, 1e, 1f) for making an attachment. With this anchoring groove 18, an advantageous configuration of the outer surface 9a is provided for an adhesive connection between the plug elements (1d, 1e, 1f) and the components. The outer plug end face 7b of the plug element 1d and the outer socket end face 8b of the plug element 1e are in contact engagement with each other. An adhesive connection between the plug diameter 6a of the socket element 1d and of the socket diameter 2a of the plug element 1e provides a tight fixed connection of the two plug elements (1d, 1e). It is advantageous when the inner socket end face 3a of the plug element 1e and the inner plug end face 4a of the plug element 1d do not lie exactly on each other and, instead, conjointly define a free space 19 for a possible follow-up cementing of the cementing surface 2a to the cementing surface 6a.

The plug elements 1 described with reference to FIGS. 1 and 2 are especially suitable for mounting at their optimal attachment points. This is explained below with reference to FIGS. 3a to 3c.

Figure 3A:
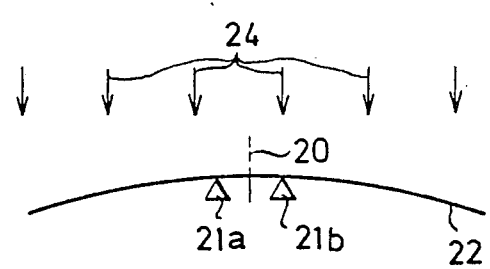
FIG. 3a is a schematic representation of the deformation of a tube wherein the support points have too narrow a spacing therebetween.

FIG. 3a shows a straight beam 22 which is loaded by the applied forces 24. When its supports (21a and 21b) are too close to each other, then the beam 22 deflects at its ends. An upwardly directed deflection occurs then between the two supports (21a and 21b). In the illustrated case, these relationships are symmetrical to the center 20 of the supports (21a and 21b) and of the beam 22.

Figure 3B:
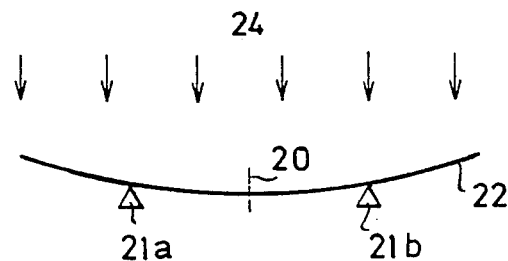
FIG. 3b is a deformation of tubes wherein too large a spacing is provided between the support points.

On the other hand, if the supports (21a and 21b) are far apart as shown in FIG. 3b, the beam 22 bends downwardly at the center 20 with the lowest point being between the supports (21a and 21b). On the other hand, outside of the supports (21a and 21b), the beam 22 bends upwardly.

Figure 3C:
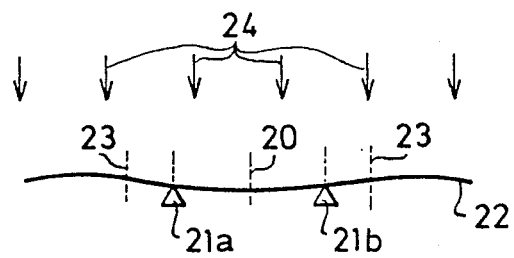
FIG. 3c shows the Bessel points for the lowest deformation of the tube tangents.

FIG. 3c shows the optimal positioning of the supports (21a and 21b). Here too, the relationships are symmetrical to the center 20 between the supports 21a and 21b. The beam 22 is supported by the supports (21a and 21b) just ahead of the points of inflection whereby a total minimized deformation of the beam 22 results. The points at which the beam 22 must be supported in order to obtain a minimum deformation are known as the Bessel points.

Optical components are known which have a tube-like configuration. This is the case, for example, in a Wolter telescope. In a Wolter telescope, the tubes serve to focus the incident radiation. It is essential that the tubes have the least possible deformation in use in order to obtain an optimal focusing result. Furthermore, an optimal force distribution is obtained by means of the support at the Bessel points whereby the size of the tube parts must sustain lower forces and can be built correspondingly lighter. The assembly of such a Wolter telescope with the plug elements described above is shown in FIG. 4.

Figure 4:
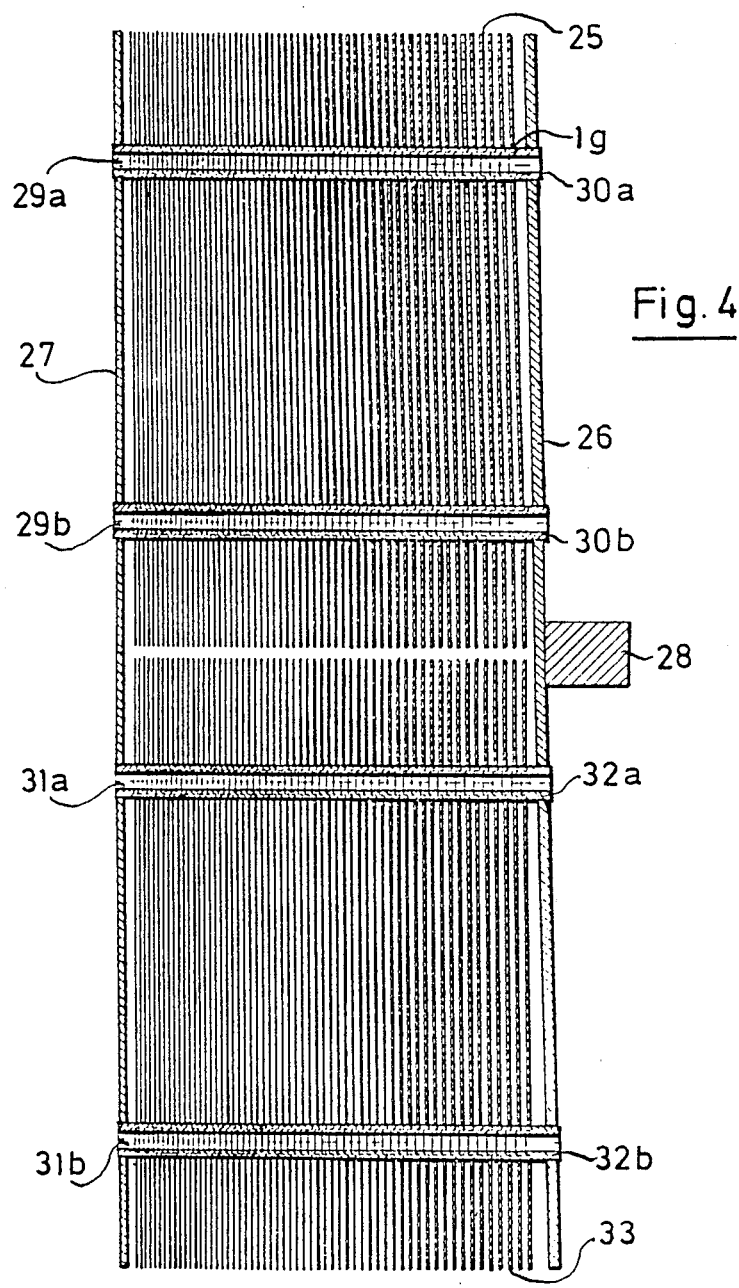

FIG. 4 shows a Wolter telescope with a portion thereof cut away so that the assembly thereof can be seen. The optically effective components of this telescope are a pair of tubes of which the packet facing toward the focus is made of hyperbolic dishes 25; whereas, the packet facing the source comprises parabolic tubes 33. The first packet of tubes is held by three radial spokes of which two radial spokes (30a and 30b) are shown. On the other hand, the second packet is held by three radial spokes of which two radial spokes (32a and 32b) are shown. The spokes connect the inner supporting tube 27 with the outer supporting tube 26 with only two spokes being shown for each packet. A central flange 28 is provided on the outer supporting tube 26. Each of the spokes (30a, 30b and 32a, 32b) is made up of individual plug elements 1g which are inserted one in the other and are cemented to each other. For increasing the stiffness, a tension member (not shown) disposed in the bores (29a, 29b and 31a, 31b) of the plug elements 1g can be used. The individual tubes (33 and 25) are cemented with the spokes (30a, 30b and 32a, 32b).

Figure 5B:
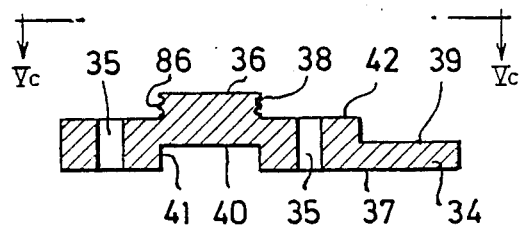
FIG. 5b is an alternate embodiment of the plug element shown in FIG. 5a with one receiving slot.
Figure 5E:
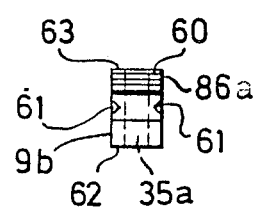
FIG. 5e is a side elevation view of a third embodiment of the plug element shown in FIG. 5a provided with an anchoring groove.
Figure 5C:
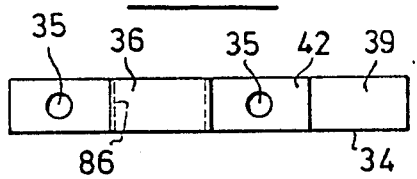
FIG. 5c is a plan view of the plug element of FIG. 5b.
Figure 5A:
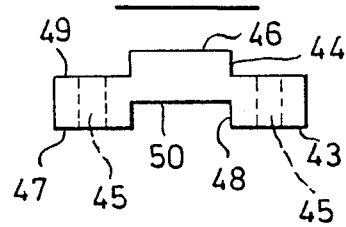
FIG. 5a is a side elevation view of a plug element having two bores formed therein.

FIG. 5a shows another embodiment of the arrangement according to the invention. The plug element 43 has two bores 45 in lieu of a central bore. These bores 45 extend through the outer plug end faces 49 and the outer socket end faces 47 and can be utilized as openings for tension members. The form of the plug and of the socket provides that the plug elements 43 no longer can be rotated relative to one another. The adhesive connection between the plug elements 43 can be advantageously provided at the interface conjointly defined by the plug diameter 44 and the socket diameter 48. The inner plug end face 46 of the lower plug element 43 has as its complement the inner socket end face 50.

FIG. 5b shows a section view taken through an alternate plug element 34 configured in the manner of plug element 43 of FIG. 5a. Here too, there are two bores 35 provided through the outer socket end face 37 and the plug end face 42. The plug elements 34 are so configured that the inner plug end face 36 of the lower plug element is parallel to the inner socket end face 40 of the upper plug element 34 in the connected condition. The adhesive connection is provided at the interface of the socket diameter 41 and the plug diameter 38 with adhesive pockets 86 being provided at the plug diameter 38. Furthermore, a receiving slot defined in part by surface 39 is provided pursuant to a feature of the invention wherein an attachment of a component can be made.

A plan view of the plug element 34 is provided in FIG. 5c.

Figure 5D:
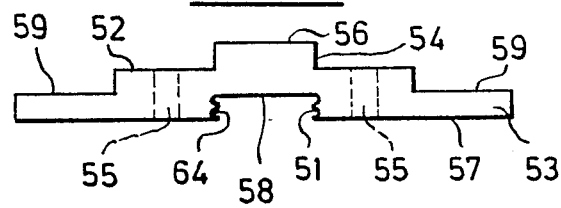
FIG. 5d is another embodiment of the plug element of the kind shown in FIG. 5a with two receiving slots.

In FIG. 5d, two holding tabs 59 are provided on the plug element 53 having the two bores 55 so that the components can be attached to both sides of a spoke with the spoke being built up from individual plug elements 53. The adhesive pockets 64 are provided in the socket diameter 51 in the plug element 53. As with the basic configuration of the plug element 43 of this type, the bores 55 connect the outer socket end faces 57 with the outer plug end faces 52. The inner plug end face 56 and the socket end face 58 of two plug elements 53 connected together are adjacent and parallel to each other. The adhesive joint for obtaining a tight connection is located at the interface conjointly defined by the plug diameter 54 and the socket diameter 51.

FIG. 5e is a side elevation view of a plug element 60 of the kind 43 shown in FIG. 5a. FIG. 5e provides a clear view of the plug diameter 63 and its adhesive pockets 86a. A bore 35a through the outer socket end face 62 is indicated by dash lines. An anchoring groove 61 for attaching the components is provided on the sides of each plug element 60.

Figure 6:
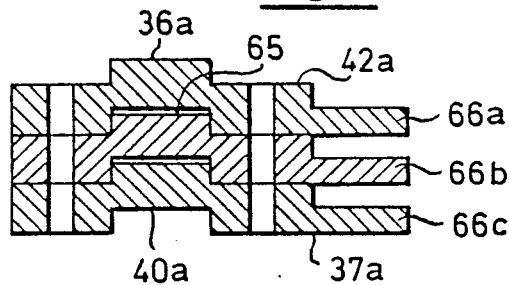

FIG. 6 shows several plug elements (66a, 66b, 66c) inserted one into the other. For obtaining a practical configuration of the plug elements, it is preferable that a gap 65 be defined between the inner socket surface 40a of the upper plug element 66a and the inner plug surface 36a of the lower plug element 66b so that the two defined supporting surfaces are obtained which are here indicated by reference numerals 37a and 42a, respectively. This configuration is similar to that shown in FIG. 2.

Figure 7:
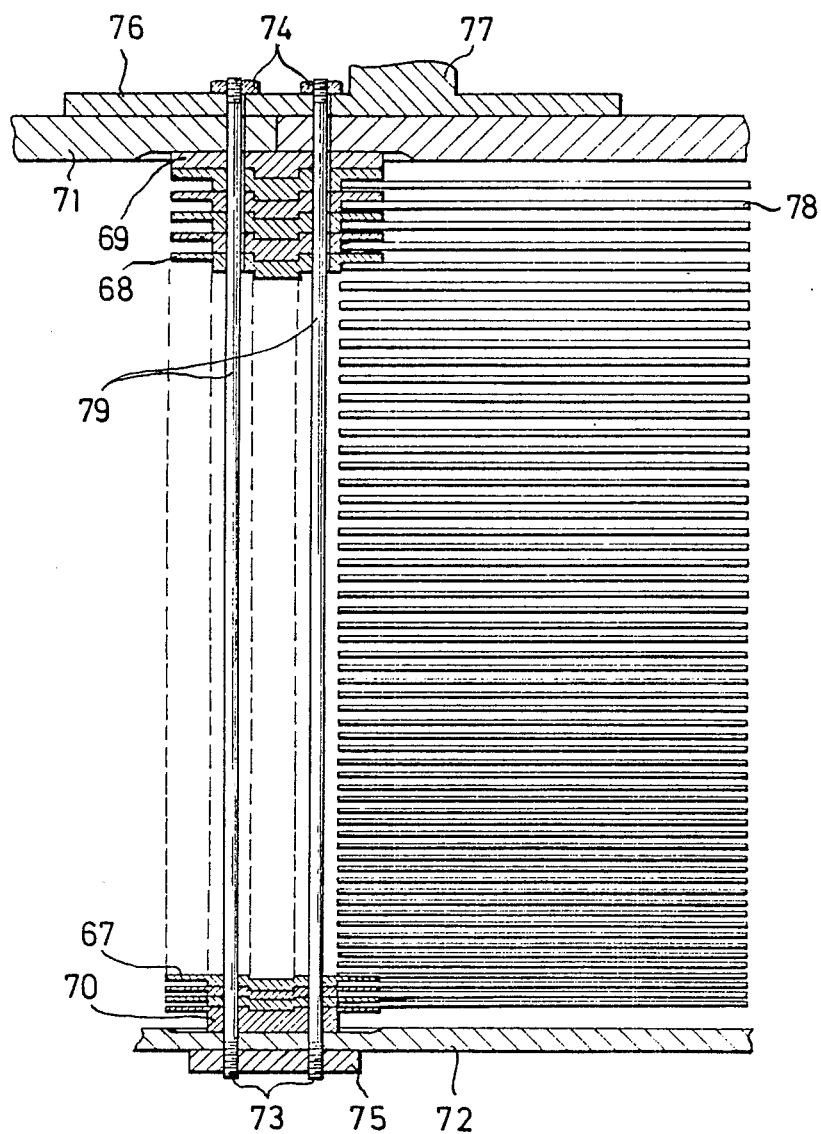
FIG. 7 is an assembly arrangement of a Wolter telescope utilizing the plug elements of FIG. 4.

FIG. 7 is a cut-out portion of a Wolter telescope with the tubes not supported at their Bessel points. The telescope tubes 78 are located between the inner supporting tube 72 and the outer supporting tube 71. The telescope tubes are held by the plug elements which are first somewhat thinner as indicated by reference numeral 67 and then somewhat larger as indicated by reference numeral 68. The particular receiving slot of the plug elements (67, 68) is only produced after alignment of the individual telescope tubes 78. This formation of the receiving slot from a rough dimension to the particular finished size assures an adhesive gap of approximately 0.2 mm in the region where the telescope tubes 78 are cemented with the plug elements (67, 68). An end piece 70 is provided at the boundary to the inner supporting tube 72. Similarly, a suitable end piece 69 is provided at the end as a transition to the outer supporting tube 71. The plug elements (67, 68) are held together by means of respective tension members 73 through corresponding ones of the bores 79 of the plug elements (67, 68). These tension members 73 are provided with a tension bolt anchor 75 at the inner side of the inner supporting tube 72. On the outside of the outer supporting tube 71, a flange tube 76 is provided as a holding means for the attachment nuts and attachment pins 74. The central flange 77 of the telescope is provided on this flange tube 76.

Figure 8:
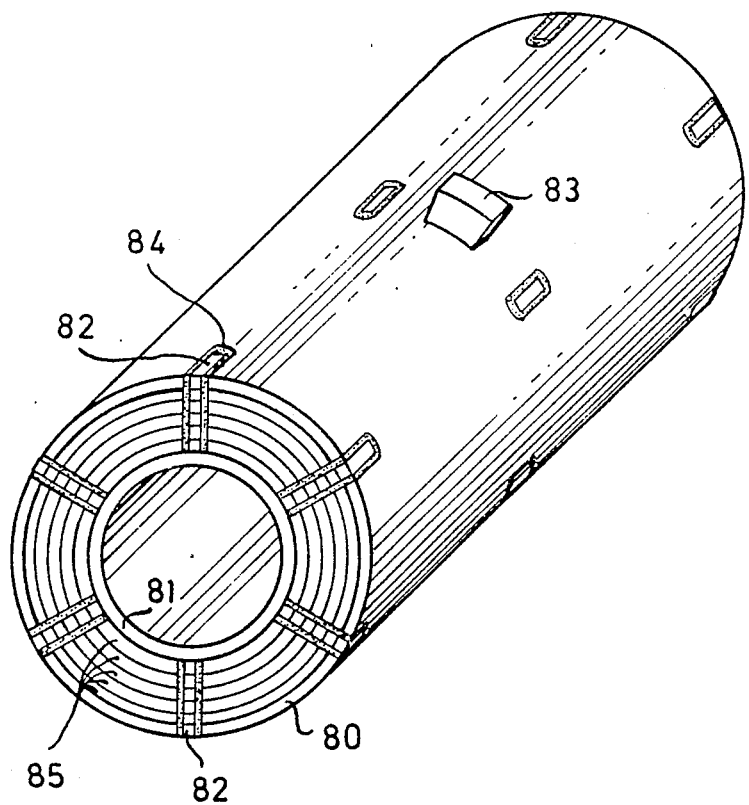
FIG. 8 is a perspective view of a finished Wolter telescope.

FIG. 8 is a perspective view of a Wolter telescope viewed from the outside thereof. An outer supporting tube 80 surrounds the optical inlet face 85 which is bounded on the inside by an inner supporting tube 81. The tubes are held by spokes 82. An attachment nut 84 prevents a radial displacement of the spokes 82 in the region of the optical entrance face 85. The telescope is manipulated when in use with the aid of the central flange 83.

It is understood that the foregoing description is that of the preferred embodiments of the invention and that various changes and modifications may be made thereto without departing from the spirit and scope of the invention as defined in the appended claims.

What is claimed is:

1. An arrangement for holding components, the arrangement comprising:
   a plurality of plug elements arranged in a stack one on top of the other with said stack defining a longitudinal axis;
   each of said plug elements having an insert portion and a socket portion at respective longitudinal ends thereof;
   the insert portion of each of said plug elements being dimensioned to insertingly engage the socket portion of the next adjacent plug element in the stack so as to cause said insert portion and said socket portion to conjointly define a connecting interface therebetween;
   each two mutually adjacent ones of said plug elements having respective contact engaging surfaces separate from said connecting interface which are in direct uninterrupted contact engagement with each other when said plug elements are stacked to define said longitudinal axis;
   attaching means disposed at said connecting interface between each two mutually adjacent ones of said plug elements to fixedly attach said plug elements to each other;
   each of said plug elements having an outer surface extending transversely to said axis;
   holding means at said outer surface for holding one of the components thereon;
   pocket means formed on each one of said plug elements at said connecting interface; and,
   said attaching means being adhesive disposed in said pocket means to cement each two mutually adjacent ones of said plug elements together.

2. The arrangement of claim 1, said plug elements each having an opening formed therein so as to cause a channel to extend through said stack in the direction of said axis.

3. The arrangement of claim 1, said holding means being a recess formed in the outer surface of each of said plug elements for holding one of the components therein.

4. The arrangement of claim 1, each of said plug elements having first and second outer surfaces formed thereon so that the first outer surface of each of said plug elements and the second outer surface of the next adjacent plug element in the stack conjointly define said holding means for holding one of the components.

5. An arrangement for holding components, the arrangement comprising:
   a plurality of plug elements arranged in a stack one on top of the other with said stack defining a longitudinal axis;
   each of said plug elements having an insert portion and a socket portion at respective longitudinal ends thereof;
   the insert portion of each of said plug elements being dimensioned to insertingly engage the socket portion of the next adjacent plug element in the stack so as to cause said insert portion and said socket portion to conjointly define a connecting interface therebetween;
   each two mutually adjacent ones of said plug elements having respective contact engaging surfaces separate from said connecting interface which are in direct uninterrupted contact engagement with each other when said plug elements are stacked to define said longitudinal axis;
   each two of said contact engaging surfaces conjointly defining a contact engaging plane;
   said connecting interface extending in a direction transverse to said contact engaging plane;
   attaching means disposed at said connecting interface between each two mutually adjacent ones of said plug elements to fixedly attach said plug elements to each other;
   each of said plug elements having an outer surface extending transversely to said axis;
   holding means at said outer surface for holding one of the components thereon;
   pocket means formed on each one of said plug elements at said connecting interface; and,
   said attaching means being adhesive disposed in said pocket means to cement each two mutually adjacent ones of said plug elements together.

6. An arrangement for holding components, the arrangement comprising:
   a plurality of plug elements arranged in a stack one on top of the other with said stack defining a longitudinal axis;
   each of said plug elements having an insert portion and a socket portion at respective longitudinal ends thereof;
   the insert portion of each of said plug elements being dimensioned to insertingly engage the socket portion of the next adjacent plug element in the stack so as to cause said insert portion and said socket portion to conjointly define a connecting interface therebetween;
   each two mutually adjacent ones of said plug elements having respective contact engaging surfaces separate from said connecting interface which are in direct uninterrupted contact engagement with each other when said plug elements are stacked to define said longitudinal axis;
   attaching means disposed at said connecting elements between each two mutually adjacent ones of said plug elements to fixedly attach said plug elements to each other;
   each of said plug elements having an outer surface extending transversely to said axis;
   holding means at said outer surface for holding one of the components thereon;
   pocket means formed on each one of said plug elements at said connecting interface;
   said attaching means being adhesive to cement each two mutually adjacent ones of said plug elements together; and,
   said interface extending in a direction parallel to said longitudinal axis.

7. The arrangement of claim 2, wherein the components held in said arrangement are substantially annular members and said arrangement further comprising that said plug elements are stacked radially to said components so as to cause each two mutually adjacent ones of said plug elements to hold a corresponding one of said components.

8. The arrangement of claim 7, said components being part of a unit including an inner conduit and an outer conduit concentric with said inner conduit, said annular members being mutually concentric and arranged between said conduits, said plug elements being stacked to form a spoke interconnecting said conduits.

9. The arrangement of claim 1, said components conjointly defining Bessel points, and said plug elements being connected to said components for holding the latter in said points.

10. The arrangement of claim 1, said attaching means comprising adhesive for connecting said components to said plug elements.

11. The arrangement of claim 1, each two mutually adjacent ones of said plug elements conjointly defining a recess for holding a component therein, the recesses of a stack of said plug elements being given their final form after the stack is aligned.

12. The arrangement of claim 1, each of said plug elements having a form adapted to the form of the components to be held.

13. An arrangement for holding components, the arrangement comprising:

a plurality of plug elements arranged in a stack one on top of the other with said stack defining a longitudinal axis;

each of said plug elements having an insert portion and a socket portion at respective longitudinal ends thereof;

the insert portion of each of said plug elements being dimensioned to insertingly engage the socket portion of the next adjacent plug element in the stack so as to cause said insert portion and said socket portion to conjointly define a connecting interface therebetween;

each two mutually adjacent ones of said plug elements having respective contact engaging surfaces separate from said connecting interface which are in direct uninterrupted contact engagement with each other when said plug elements are stacked to define said longitudinal axis;

each two of said contact engaging surfaces conjointly defining a contact engaging plane;

said connecting interface extending in a direction transverse to said contact engaging plane;

attaching means disposed at said connecting interface between each two mutually adjacent ones of said plug elements to fixedly attach said plug elements to each other;

each of said plug elements having an outer surface extending transversely to said axis;

holding means at said outer surface for holding one of the components thereon; and, said attaching means being a threaded connection formed at said interface for holding said plug elements together.

* * * * *

UNITED STATES PATENT AND TRADEMARK OFFICE
CERTIFICATE OF CORRECTION

PATENT NO. : 4,936,472
DATED : June 26, 1990
INVENTOR(S) : Hans-Jürgen Meier

It is certified that error appears in the above-identified patent and that said Letters Patent is hereby corrected as shown below:

In column 4, line 56: insert -- tubes -- between "mounting" and "at".

In column 8, line 50: delete "elements" and substitute -- interface -- therefor.

Signed and Sealed this

Tenth Day of September, 1991

Attest:

HARRY F. MANBECK, JR.

*Attesting Officer*  Commissioner of Patents and Trademarks